United States Patent
Potthoff

(10) Patent No.: US 6,840,077 B2
(45) Date of Patent: Jan. 11, 2005

(54) ROLL STAND FOR ROLLING BAR-SHAPED OR TUBULAR MATERIAL

(75) Inventor: Heinrich Potthoff, Hilden (DE)

(73) Assignee: Kocks Technik GmbH & Co. (DE)

( * ) Notice: Subject to any disclaimer, the term of this patent is extended or adjusted under 35 U.S.C. 154(b) by 0 days.

(21) Appl. No.: 10/238,833

(22) Filed: Sep. 10, 2002

(65) Prior Publication Data

US 2003/0046968 A1 Mar. 13, 2003

(30) Foreign Application Priority Data

Sep. 12, 2001 (DE) .......................................... 101 44 974

(51) Int. Cl.[7] .............................................. B21B 31/07
(52) U.S. Cl. .......................................... 72/237; 72/224
(58) Field of Search ........................ 72/238, 237, 239, 72/240, 244, 245, 246, 247, 248, 249, 367.1, 368, 224; 277/364; 492/15

(56) References Cited

U.S. PATENT DOCUMENTS 2,740,647 A  *  4/1956  Van Pelt ...................... 384/475
4,422,698 A  * 12/1983  Aoki et al. .................. 384/482
4,817,410 A  *  4/1989  Yatsuzuka et al. ............ 72/199

* cited by examiner

*Primary Examiner*—Lowell A. Larson
(74) *Attorney, Agent, or Firm*—Cook, Alex, McFarron, Manzo, Cummings & Mehler, Ltd.

(57) ABSTRACT

The roll stand having at least one roll shaft 2, which carries a roll 6 and is subdivided into sectional shafts 3, 4 for the purpose of being able to change the roll, comprises at least one labyrinth-seal arrangement which is arranged in an annular gap 23, 24 formed between the respective sectional shaft 3, 4 and a bearing device for the roll shaft.

5 Claims, 1 Drawing Sheet

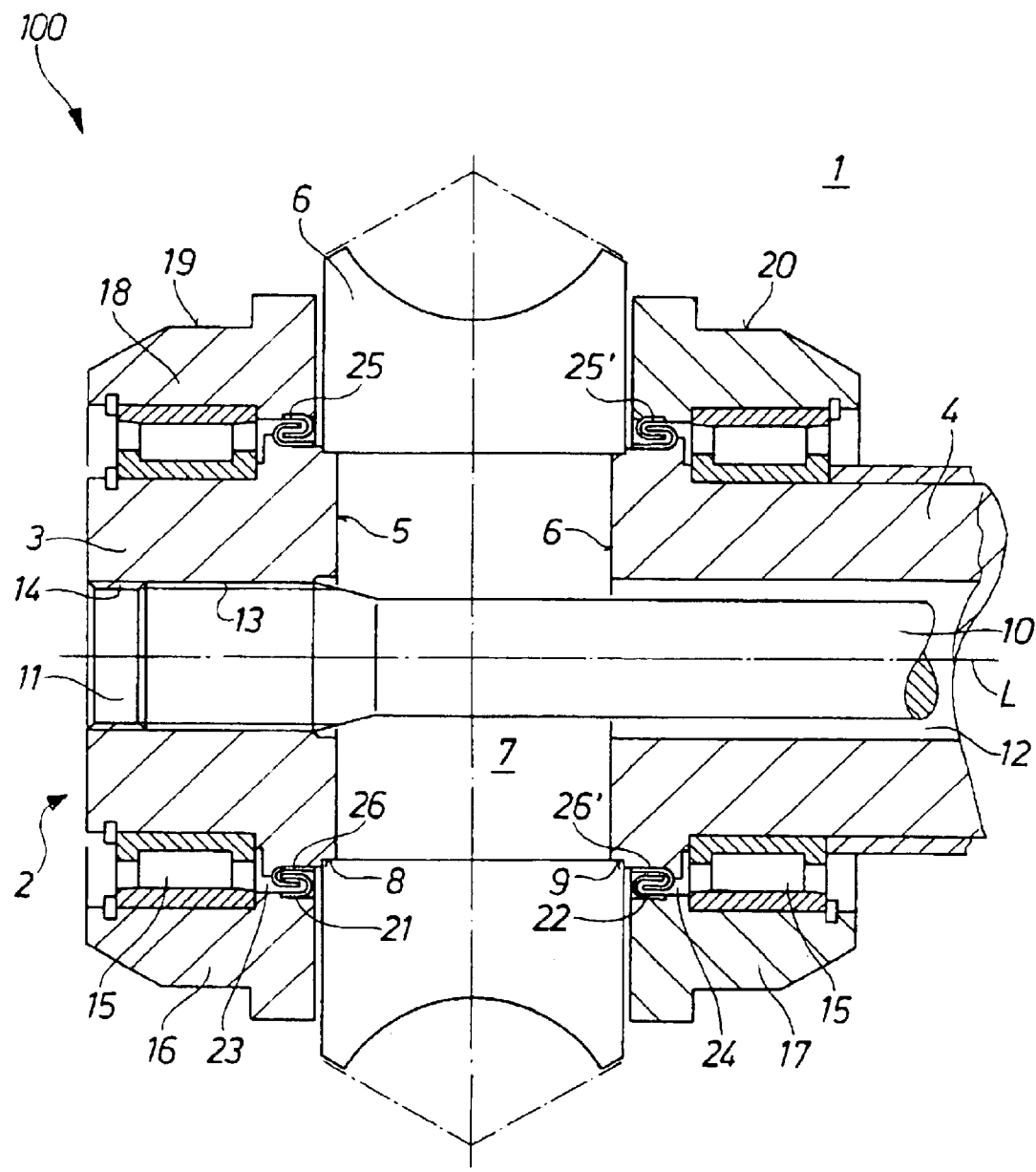

ROLL STAND FOR ROLLING BAR-SHAPED OR TUBULAR MATERIAL

CROSS-REFERENCE TO RELATED APPLICATIONS

The invention relates to a roll stand for rolling bar-shaped or tubular material, and claims the priority of German Patent Application 101 44 974.7, to the contents of which reference is made.

BACKGROUND OF THE INVENTION

Such roll stands usually comprise a number of rolls, mostly three rolls, which are each provided on a roll shaft rotatably mounted in the stand housing. In this case, the rolls are arranged relative to one another in such a way that their axes of rotation lie in a plane perpendicularly to the rolling direction at the same distance from a common center point, so that respectively adjacent rolls are at the same angular distance from one another. The rolls thus together form a "roll pass".

Many configurations of roll stands of this type are known. In order to be able to remove the rolls quickly from the stand and without complicated dismantling work and to be able to exchange them for those with a roll pass recently machined, the roll shafts, in a special embodiment of the roll stands, are each subdivided into two sectional shafts and each roll is clamped in place between two facing end faces of the two sectional shafts in a fixed but releasable manner. The clamping force is applied by means of a tie rod arranged in a central longitudinal bore of the roll shaft and is maintained during the operation of the roll stand.

If a roll is to be changed, only the tie rod is to be released and shifted in the axial direction to such an extent that it clears the separating location of the two sectional shafts. The two sectional shafts are then to be moved apart axially to such an extent that the roll can be removed transversely to the roll shaft.

Rolling-contact bearings normally serve to radially mount the roll shaft in the stand housing, these rolling-contact bearings being arranged on both sides of the roll and thus interacting in each case with one of the two sectional shafts. The rolling-contact bearings in turn are either supported in a corresponding bore directly in the stand housing, or a bearing bush fitted in between the stand-housing bore and the rolling-contact bearings is provided. This bearing bush may be designed as an eccentric bush, so that the roll shaft can be shifted in the radial direction by rotating the eccentric bush relative to the stand housing and thus the distances of the roll-shaft longitudinal axes from the common center point of the roll stand can be set in an infinitely variable manner.

The rolling-contact bearings are normally grease-lubricated, so that an oil-tight seal arrangement, which is costly to produce and is susceptible to faults, between the interior of the bearing device provided in the stand housing and the surroundings can be dispensed with.

However, in order to avoid a situation in which contaminants can reach the rolling-contact bearings through the stand-housing opening, through which the roll emerges with its working periphery, which contaminants would substantially increase the wear of the rolling-contact bearings, it is known to inject air with slight positive pressure in the direction of the stand-housing opening from the ends of the roll shafts, this air, due to the air flow directed outward in the region of the stand-housing opening, essentially preventing ingress of dirt particles.

Since, with increasing volumetric flow, there is the risk of the grease provided for lubricating the bearings being dragged along outward via the stand-housing opening by the air which is flowing through, labyrinth-seal arrangements acting on both sides of the roll between the sectional shafts of the roll axis and the eccentric bush are provided in a roll stand disclosed by the applicant. To this end, the sectional shafts each have a radial straight surface, on which two annular extensions formed concentrically to the roll-shaft axis and extending in the direction of the roll-shaft axis are integrally formed. Complementary annular grooves, in which the extensions engage and thus form the labyrinth-seal arrangement, are accordingly made in a respectively opposite, radial straight surface of the eccentric bush.

As already mentioned, the two sectional shafts can be moved apart in the axial direction by an adjusting displacement for the roll change. To this end, the annular grooves are made in the respective radial straight surface of the eccentric bush to such a depth that there is a distance between the ends of the projections and the base areas of the annular grooves when the roll is fitted, this distance corresponding to at least the adjusting displacement.

Although this configuration reliably produces a sealing effect which reduces the volumetric flow to such an extent that only small quantities of lubricating grease can reach the labyrinth-seal arrangement, the lubricating grease immediately serving here to lubricate the seal arrangement, it is a disadvantage that machining of both the sectional shafts and the eccentric bush is necessary in order to produce this labyrinth-seal arrangement, this machining making the arrangement very costly to produce.

BRIEF SUMMARY OF THE INVENTION

The object of the invention is therefore to provide a roll stand whose seal arrangement between the sectional shafts and the bearing device in the stand housing can be produced at less cost.

This object is achieved by the present invention as set forth in the appended claims.

Owing to the fact that, in the roll stand according to the invention, the labyrinth-seal arrangement is arranged in an annular gap formed between the respective sectional shaft and the bearing device, the labyrinth-seal arrangement can be formed by separate labyrinth rings which can be fastened to the outer periphery of the sectional shaft and respectively to the inner periphery of the bearing device, for example by pressing them on or by pressing them into position. Machining of the sectional shafts and of the bearing device for producing the labyrinth-seal arrangement can thus be completely dispensed with.

In a preferred embodiment, the labyrinth-seal arrangement has at least one inner labyrinth ring comprising at least one labyrinth surface and arranged on the respective sectional shaft and an outer labyrinth ring comprising at least one opposing labyrinth surface and arranged on the bearing device.

If the inner and the outer labyrinth rings—as is especially preferred—are arranged so as to be oriented in such a way that they are shifted relative to one another in the direction of the disengagement when the sectional shafts are shifted for the purpose of releasing the roll, the labyrinth surfaces and the opposing labyrinth surfaces move past one another and do not move toward one another as in the prior art. By this measure, the labyrinth can be configured in such a way that a maximum overlap of the labyrinth surfaces and opposing labyrinth surfaces and thus an optimum sealing effect are, obtained in the operating position of the sectional shafts, i.e. when the roll is fitted.

The labyrinth rings can be produced from flat material by non-cutting shaping in an especially inexpensive manner.

The material used may be metal sheet, the processing for the labyrinth ring being effected, for example, by punching and subsequent forming, e.g. by deep drawing or pressing.

BRIEF DESCRIPTION OF THE DRAWING

A detail of a roll-shaft arrangement of a roll stand according to the invention is shown in the drawing, this roll-shaft arrangement being arranged in a stand housing 1 (not separately shown in the drawing).

DETAILED DESCRIPTION OF THE EMBODIMENTS

The roll-shaft arrangement designated overall by 100 comprises a roll shaft 2 which consists of two sectional shafts 3, 4. A roll 6 is clamped in place between those end faces 5, 6 of the sectional shafts 3, 4 which face one another.

To this end, the roll 6 has a radially symmetrical through-bore 7. For the purpose of centering the roll 6 on the roll shaft 2, the end faces 5, 6 are provided with radially symmetrical shoulders 8, 9, the radii of which are adapted to the diameter of the through-bore 7.

A tie rod 10 which passes through the sectional shafts 3, 4 in central longitudinal bores 11, 12 serves to apply the clamping force for clamping the roll 6 in place between the sectional shafts 3, 4. That end of the tie rod 10 which is shown on the left in the drawing has an external thread 13 which engages in a corresponding internal thread 14 which is provided in the bore 11 of the sectional shaft 3. At its opposite end section, which cannot be seen in the drawing, the tie rod carries a clamping nut, which can be screwed from outside onto the end section and is supported in the tightened state in the direction of the roll-shaft longitudinal axis L on a supporting surface provided on the end face of the sectional shaft 4.

The roll shaft 2 is rotatably mounted by means of rolling-contact bearings 15 arranged on both sides of the roll 6. In this case, the rolling-contact bearings 15 are located in the halves 16, 17 of an eccentric bush 18, which are divided in a plane E perpendicularly to the roll-shaft longitudinal axis L.

Each half 16, 17 of the eccentric bush 18 has an outer seating surface 19, 20 which is circular in cross section and bears against the stand housing 1 in each case in a corresponding recess (not shown in any more detail in the drawing).

The eccentric bush 18 together with the rolling-contact bearings 15 forms a bearing device for the rotatable mounting of the roll shaft 2 in the stand housing 1.

A labyrinth-seal arrangement 21, 22 is arranged in each case between the two halves 16, 17 of the eccentric bush 18 and the associated sectional shaft 3, 4.

The labyrinth-seal arrangements 21, 22 are each arranged in an annular gap 23, 24 which is formed between the half 16 of the eccentric bush 18 and the outer peripheral surface of the sectional shaft 3 or respectively between the half 17 of the eccentric bush 18 and thersectional shaft 4, in each case adjacent to the shoulder 8, 9.

Each labyrinth-seal arrangement consists of an outer labyrinth ring 25, 25' which interacts with an inner labyrinth ring 26, 26'. Both labyrinth rings 25, 25' and 26, 26', respectively, are of roughly U-shaped design in cross section, in each case a leg of the "U", for the purpose of fixing, firmly bearing against the inner lateral surface of the half 16 or 17, respectively, or against the outer lateral surface of the sectional shaft 3 or 4, respectively.

The inner labyrinth rings 26, 26' are oriented in such a way that their free legs face the roll 6. On the other hand, the outer labyrinth rings 25, 25' are oriented the other way round, so that their free leg points away from the roll and—as viewed in the radial direction—engages behind the adjacent free leg of the respectively associated inner labyrinth ring 26 or 26'.

As can be seen directly from the drawing, the free legs of the labyrinth rings 25, 26 and 25', 26', which are assigned to one another, overlap virtually to the maximum extent, so that a maximum sealing effect is achieved during the operation of the roll stand. Nonetheless, for the purpose of a roll change, it is possible to move the sectional shafts 3, 4 apart without manipulation at the labyrinth-seal arrangements 21, 22, since the inner and the outer labyrinth rings 25, 26 and 25', 26' are in the process shifted relative to one another in the direction of the disengagement.

What is claimed is:

1. A roll stand for rolling bar-shaped or tubular material, having
   a stand housing (1),
   at least one roll (6) which is arranged on a roll shaft (2) mounted in a rotatable manner in the stand housing (1), the roll shaft (2) being subdivided into at least two sectional shafts (3, 4) in such a way that the roll (6), can be removed from the roll shaft (2) after the sectional shafts (3, 4) have been moved apart by a distance in the axial direction,
   a bearing device provided in the stand housing (1) and supporting the roll shaft (2) in a rotatable manner, and
   at least one labyrinth-seal arrangement (21, 22) which is provided at least between one of the sectional shafts (3, 4) and the bearing device and permits the shifting of the sectional shafts (3, 4) by the distance,
   wherein the labyrinth-seal arrangement (21, 22) is arranged in an annular gap (23, 24) formed between the respective sectional shaft (3, 4) and the bearing device.

2. The roll stand as claimed in claim 1, wherein the labyrinth-seal arrangement (21, 22) has at least one inner labyrinth ring (26, 26') having at least one labyrinth surface and arranged on the respective sectional shaft (3, 4) and an outer labyrinth ring (25, 25') having at least one opposing labyrinth surface and arranged on the bearing device.

3. The roll stand as claimed in claim 2, wherein the inner and the outer labyrinth rings (25, 26 and 25', 26') are arranged so as to be oriented in such a way that they are shifted relative to one another in the direction of the disengagement when the sectional shafts (3, 4) are shifted for the purpose of releasing the roll.

4. A labyrinth ring for use in the roll stand claimed in claim 2, wherein said labyrinth ring is produced from a flat material by non-cutting shaping.

5. A labrinth ring for use in the roll stand claimed in claim 3, wherein said labyrinth ring is produced from metal sheet by punching and possibly plastic deformation.

* * * * *